US010604317B2

(12) United States Patent
Chmelar et al.

(10) Patent No.: US 10,604,317 B2
(45) Date of Patent: Mar. 31, 2020

(54) REUSABLE TIE STRAP WITH MULTIPLE APERTURES

(71) Applicants: Erik Vaclav Chmelar, Ann Arbor, MI (US); Gary Louis Kozminske, Mattawan, MI (US)

(72) Inventors: Erik Vaclav Chmelar, Ann Arbor, MI (US); Gary Louis Kozminske, Mattawan, MI (US)

(73) Assignee: Dera Industries, LLC, Midland, MI (US)

(*) Notice: Subject to any disclaimer, the term of this patent is extended or adjusted under 35 U.S.C. 154(b) by 0 days.

(21) Appl. No.: 15/444,341

(22) Filed: Feb. 28, 2017

(65) Prior Publication Data
US 2018/0244447 A1  Aug. 30, 2018

(51) Int. Cl.
B65D 63/10 (2006.01)

(52) U.S. Cl.
CPC .... *B65D 63/1027* (2013.01); *B65D 2563/103* (2013.01); *B65D 2563/107* (2013.01); *Y02W 30/807* (2015.05); *Y10T 24/141* (2015.01); *Y10T 24/1498* (2015.01)

(58) Field of Classification Search
CPC .............. Y10T 24/141; Y10T 24/1498; B65D 63/1027; B65D 63/1018; B65D 2563/00; B65D 2563/10; B65D 2563/101; B65D 2563/106; B65D 2563/103
See application file for complete search history.

(56) References Cited

U.S. PATENT DOCUMENTS

| 2,979,794 | A |  | 9/1956 | Bartolo |  |
|---|---|---|---|---|---|
| 4,991,265 | A |  | 2/1991 | Campbell |  |
| 5,193,250 | A |  | 3/1993 | Caveney |  |
| 6,317,933 | B1 |  | 11/2001 | Suenaga |  |
| 6,523,229 | B2 |  | 2/2003 | Severson |  |
| 6,588,074 | B2 |  | 7/2003 | Galkiewicz |  |
| 7,866,005 | B2 |  | 1/2011 | Vermeer |  |
| 8,276,244 | B2 |  | 10/2012 | Vermeer |  |
| 9,021,665 | B2 |  | 5/2015 | Chen |  |
| 2003/0182766 | A1 | * | 10/2003 | Avinger | B65D 63/1027 24/16 PB |
| 2005/0251967 | A1 | * | 11/2005 | McNeill | B65D 63/1027 24/16 PB |
| 2005/0262672 | A1 | * | 12/2005 | Okamoto | B65D 63/1063 24/716 |
| 2008/0028576 | A1 | * | 2/2008 | Okamoto | B65D 63/1027 24/16 R |
| 2008/0276432 | A1 | * | 11/2008 | McNeill | B65D 63/1027 24/16 PB |
| 2014/0020229 | A1 | * | 1/2014 | Moore | B65D 63/1018 29/525.01 |

(Continued)

Primary Examiner — Robert Sandy
Assistant Examiner — Michael S Lee
(74) Attorney, Agent, or Firm — Erik Vaclav Chmelar

(57) ABSTRACT

A tie strap comprising a first end having a plurality of first apertures adapted to receive a medial region and to couple with a plurality of ribs defined thereon, a hooked or knobbed catch mechanism protruding from a distal portion of the first end, and a plurality of second apertures situated along the medial region adapted to receive the catch mechanism. The second apertures may be further adapted to receive the medial region and to couple with the ribs defined thereon.

8 Claims, 12 Drawing Sheets

(56) References Cited

U.S. PATENT DOCUMENTS

| | | | | |
|---|---|---|---|---|
| 2014/0096344 A1* | 4/2014 | Creato | ................... | B65D 85/04 |
| | | | | 24/16 PB |
| 2014/0283340 A1* | 9/2014 | Beckman | ............. | B65D 63/109 |
| | | | | 24/16 PB |
| 2016/0332791 A1* | 11/2016 | Beckman | ............. | B65D 63/109 |
| 2017/0050786 A1* | 2/2017 | Kozminkse | ........ | B65D 63/1027 |

* cited by examiner

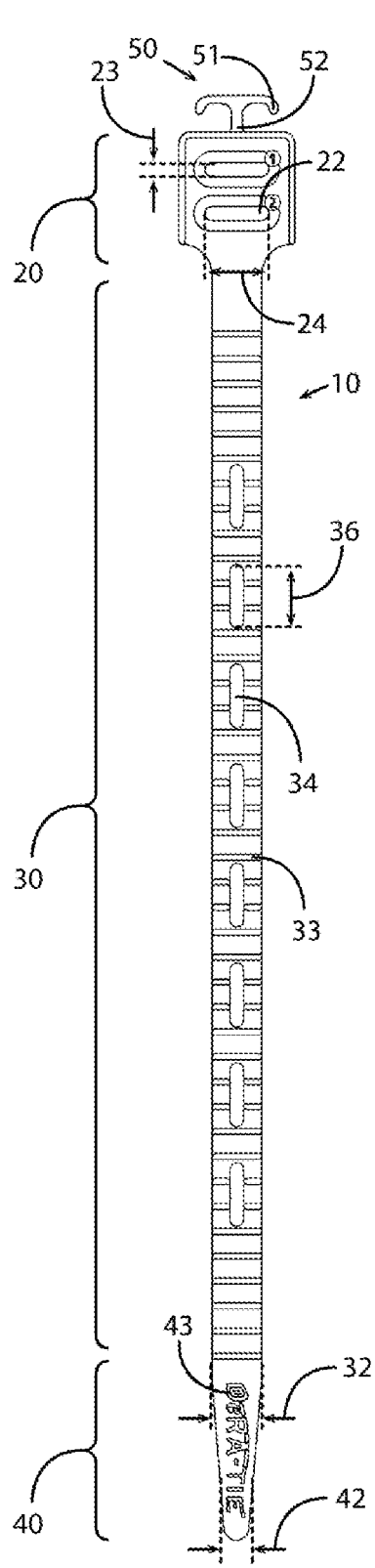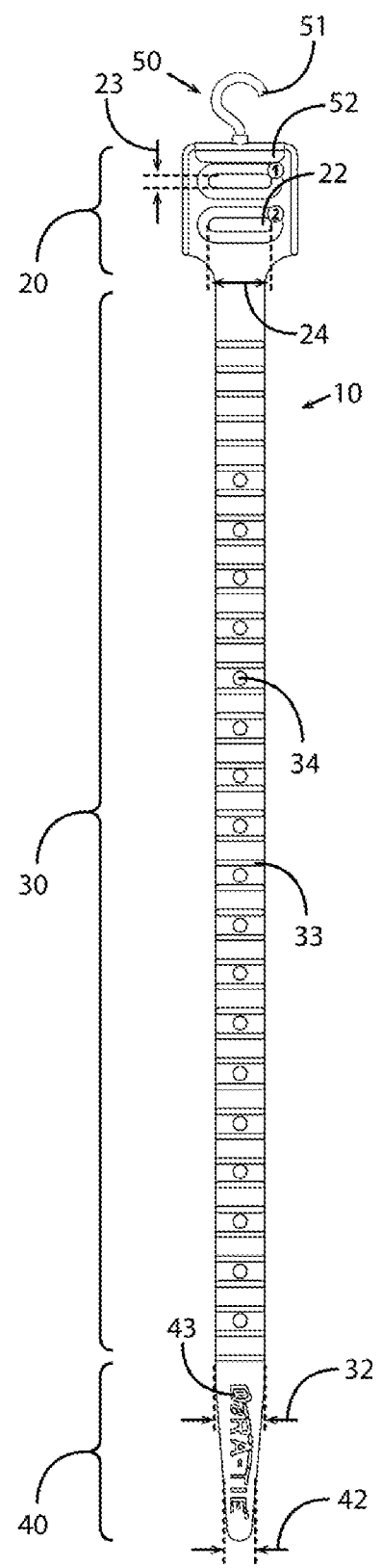
FIG. 12  FIG. 13

REUSABLE TIE STRAP WITH MULTIPLE APERTURES

CROSS-REFERENCE TO RELATED APPLICATIONS

This application is a continuation-in-part of U.S. patent application Ser. No. 14/833,095, filed Aug. 23, 2015, and is also a continuation-in-part of U.S. patent application Ser. No. 29/590,362, filed Jan. 10, 2017, which is a continuation of U.S. patent application Ser. No. 14/833,095.

BACKGROUND

The several embodiments of this disclosure relate generally to self-coupling strapping devices that may be referred to as tie straps, cable ties, zip ties, tie wraps, wire ties, and so on, whose many uses may include securing objects in place, bundling objects together, and tying bags closed. Tie straps generally comprise an elongated flexible strap extending from a stout retaining head. Disposed on the strap is usually a plurality of laterally protruding transverse ribs or grooves adapted to couple with a retaining mechanism disposed on or within the head. Common retaining mechanisms include slotted apertures through which the strap may be inserted or pawls under or against which the strap may be positioned.

Many variations exist, for example ribbed flat straps, elastomeric (compressible) straps, beaded filaments, and so on. Generally, at least one rib, bead, barb, ridge, notch, or groove of a tie strap engages with the retaining mechanism. Related strapping devices include: (1) ratchet straps and tie downs whose lateral surfaces are substantially smooth or uninterrupted and which engage with a retaining mechanism by friction, compression, or wrapping; (2) power-cord ties that engage by means of hook-and-loop fasteners (e.g., Velcro); and (3) power-cord ties that engage by means of a protruding button being inserted into a keyhole aperture.

Single-use tie straps have been around for a long time, for example U.S. Pat. No. 588,848, entitled "Bag-fastener," and more recently U.S. Pat. No. 2,979,794, entitled "Wire or Cable Bundle Tie." Although such tie straps are useful for many applications, some applications demand reusable tie straps or tie straps that can be arbitrarily tightened and loosened. Consequently, multiple-use tie straps with releasable retaining mechanisms have been developed, for example U.S. Pat. No. 4,991,265, entitled "Cord Tie Device," and U.S. Pat. No. 5,193,250, entitled "Releasable Cable Tie." Similarly, releasable retaining mechanisms have been achieved with elastomeric materials, for example U.S. Pat. No. 7,866,005, entitled "Elastomeric Releasable Cable Tie," and U.S. Pat. No. 8,276,244, also entitled "Elastomeric Releasable Cable Tie," and U.S. Pat. No. 9,021,665, entitled "Elastic Zip Tie."

U.S. Pat. No. 9,021,665, entitled "Elastic Zip Tie," teaches a foam rubber tie strap comprising a strap with a plurality of flexible fin-like ribs on two sides of a body region and only a single retaining aperture in a head region, wherein the head thickness is substantially larger than the longitudinal length of the holding space between adjacent jaws by at least 1.15 times. For such a tie strap to function, it must be made of a sufficiently stretchable material. Further, this tie strap does not include apertures in the body or a catch mechanism adjacent to the head.

German Patent Application DE 2,618,546, entitled "Closure for Hose or Bag-shaped Container," and French Patent 1,288,123, entitled "Fastener for Bags Made of Soft Material," teach tie straps for enclosing bag-shaped containers. Each has a pair of slotted apertures in a head region and a plurality of ribs on at least one lateral surface of the body. Neither tie strap includes apertures in the body or a catch mechanism adjacent to the head.

A beneficial aspect of a tie strap is the ability to secure to a first object semi-permanently and to secure to a second object temporarily. This allows the tie strap to stay attached to an object, for example a vertical post, while permitting a second object to be repeatedly secured thereto and removed therefrom, for example a broom handle. In the immediate example, the tie strap may be secured to the post for an extended duration, and the broom may be repeatedly secured thereto and unsecured therefrom while not in use. Similarly, such a tie strap may be used to bundle objects or cords. For example, a tie strap may be wrapped around and secured to several loops of an extension cord when the cord is stowed. When the cord is to be used, the temporary securing means of the tie strap may be disengaged, but the semi-permanent securing means remains engaged so that the tie strap stays attached to the end of the cord.

U.S. Pat. No. 6,317,933, entitled "Binding Band" and U.S. Pat. No. 6,588,074, entitled "Self-mating Reclosable Binding Strap and Fastener," address semi-permanent and temporary strapping by teaching a tie strap with a slotted aperture in a head region adapted to receive the body, wherein the body includes hook-and-loop (or hook-and-pile) for fastening the body to itself. A disadvantage of hook-and-loop fasteners is the loss of fastening strength due to soiling or wear. Similarly, U.S. Pat. No. 6,523,229, entitled "Cord Keeper Strap," teaches a strap comprising a slotted aperture in a head region adapted to receive the body and a plurality of keyhole apertures in the body adapted to engage with a protruding button disposed between the head and body. Some disadvantages of button-and-keyhole fasteners include splitting of the strap adjacent to a keyhole, unreliable coupling between the button and a keyhole, and coarse adjustment steps resulting from large separations between adjacent keyholes.

BRIEF SUMMARY

The several embodiments of this disclosure overcome several prior-art limitations, as well as provide additional advantages as described an illustrated herein. The tie strap provides a plurality of retaining apertures in a head region, a knobbed or hooked catch mechanism protruding from the head region, and a plurality of apertures in an elongated ribbed body region.

Each aperture in the head is adapted to receive and couple with the ribs on the body. In particular, the second (or third, fourth, etc.) aperture in the head provides for: (1) simultaneous semi-permanent and temporary strapping; (2) chaining of multiple tie straps together to create a longer tie strap; and (3) double-retaining a strap for extra holding strength and reliability.

The catch mechanism is adapted to engage with an aperture on the body. For example, the body may be inserted through a first head aperture for securing to a first object (or objects), and then inserted through a second head aperture for securing to a second object (or objects, or again to the first object). Alternatively or additionally, the body may be wrapped around an object and engaged to the catch mechanism via a body aperture. This catch mechanism allows the tie strap to more rapidly attach to and detach from an object than can generally be achieved by inserting the body through a head aperture.

Therefore, it is believed the several embodiments of this disclosure teach a novel and non-obvious system and method to achieve one or more useful outcomes never before taught in the prior art.

BRIEF DESCRIPTION OF THE DRAWINGS

FIG. 12 is a top view of a fourth embodiment.

FIG. 13 is a top view of a fifth embodiment.

DETAILED DESCRIPTION

Figure 1A:
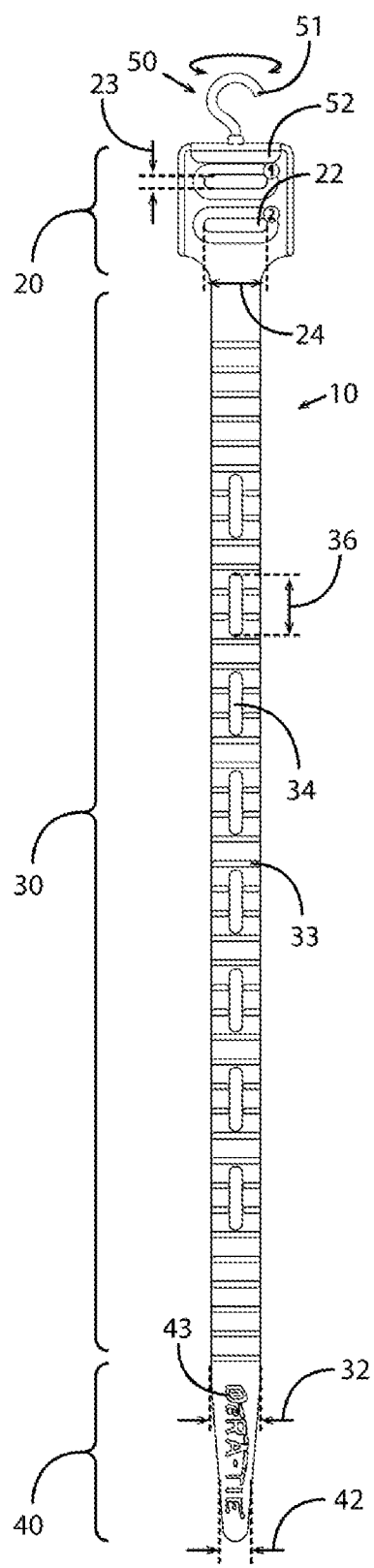
FIG. 1a and FIG. 1b are top views of a first embodiment.

Terms "head," "first region," and "first end" are synonymous; "body," "second region," and "medial region" are synonymous; and "tail," "third region," and "second end" are synonymous. Furthermore, in the appropriate context, "ridge," "rib," "jaw," and "tooth" may be synonymous, as may be "slot," "aperture," "hole," "through-hole," and "bore." Finally, "catch mechanism" may be synonymous with "hook," "grapple," "button," "post," "knob," or "stud."

The following numerals are used to identify the corresponding elements in the figures. 20-level numerals refer to the head 20, 30-level numerals refer to the body 30, 40-level numerals refer to the tail 40, and 50-level numerals refer to the catch mechanism 50.

10 tie strap
11 lateral surface, generally
11x, 11y lateral surface, different
20 head
21 head thickness
22 head aperture
23 head aperture height
24 head aperture width
30 body
31 body thickness
32 body width
33 ridge
33a, 33b ridge pair, different
34 body aperture
35 body aperture height
36 body aperture width
40 tail
41 tail thickness
42 tail width
43 embossed element
50 catch mechanism
51 catch lip
52 catch anchoring mechanism
53 anchoring tooth
54 anchoring hole FIGS. 1-4 show a first embodiment of the tie strap 10 comprising a head 20 formed on a first end, a body 30 formed on a medial region, and a tail 40 formed on a second end. In alternate embodiments not illustrated the tie strap 10 may include multiple heads 20, bodies 30, and tails 40.

The head 20 comprises a plurality of similarly dimensioned head apertures 22 extending through the entire head thickness 21. Each head aperture 22 has a head aperture height 23 along its minor dimension and a head aperture width 24 along its major dimension. The head thickness 21 is defined adjacent to the head apertures 22.

Although not illustrated, additional apertures of arbitrary size and shape may be present, such as a small circular aperture for hanging the tie strap 10 on a nail or pegboard hook. Furthermore, although head apertures 22 are illustrated as narrow slots with rounded ends, any aperture shape suitable for coupling with a body 30 may be used. Finally, although a uniform head thickness 21 is illustrated, varying head thickness 21 may be advantageous, for example to accommodate varying separations between some ridge pair 33a and an adjacent ridge pair 33b.

The body 30 generally comprises a plurality of ridge pairs 33a. Each ridge pair 33a comprises a first ridge 33 disposed on a first lateral surface 11x and a second ridge 33 disposed on an opposite second lateral surface 11y, wherein ridges 33 are oriented transversely to the longitudinal axis of the tie strap 10 and protrude laterally from the body 30. Although not illustrated, ridges 33 disposed on only one lateral surface 11 may be advantageous in some circumstances. Also, although only equally spaced ridge pairs 33a have been illustrated, it may be advantageous to space them unequally. Close spacing between some ridge pair 33a and ridge pair 33b near the head 20 permits fine-grained strapping adjustments where precision matters, for example when the tie strap 10 is secured to a small-diameter object. Similarly, far spacing between some ridge pair 33a and ridge pair 33b near the tail 40 permits coarse-grain adjustments where precision is less important, for example when the tie strap 10 is secured to a large-diameter object.

The body 30 has a body thickness 31 substantially equal to the head aperture height 23 (short dimension) and a body width 32 substantially equal to the head aperture width 24 (long dimension) to permit insertion of the body 30 through a head aperture 22. The body thickness 31 is defined between some adjacent ridge pair 33a and ridge pair 33b.

The tail 40 defines a tail thickness 41 that is less than the head aperture height 23 to enable easy insertion through a head aperture 22. The tail width 42 may be smaller than the head aperture width 24, or the tail 40 may have a generally tapered shape, to further simplify insertion of the tail 40 through a head aperture 22.

Figure 3:
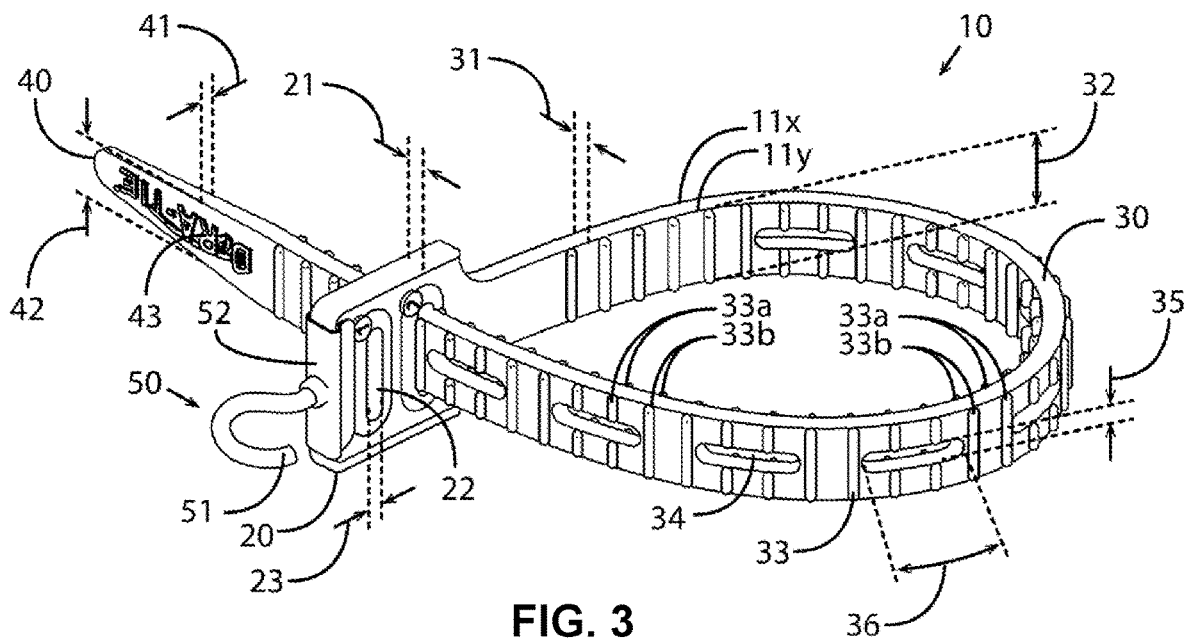
FIG. 3 shows the first embodiment wherein the body is engaged to a head aperture.

FIG. 3 shows a perspective view of the tie strap 10 with the body 30 coupled to the head 20 through one of the head apertures 22. A user may couple the body 30 to the head 20 by: (1) inserting the tail 40 through a head aperture 22; (2) gripping the tail 40; and (3) pulling the tail 40 (and body 30) until at least one ridge pair 33a has traversed through the head aperture 22. A plurality of embossed elements 43 may be disposed on the tail 40 to facilitate easier gripping.

Figure 4A:
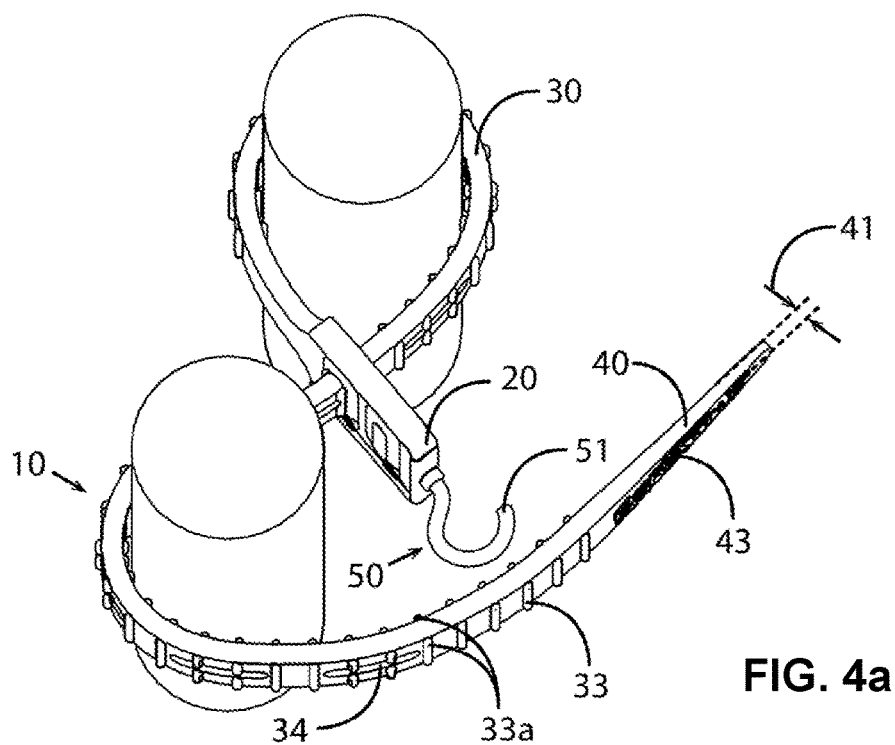
FIG. 4a shows the first embodiment secured to a first object by means of a first head aperture.
Figure 4B:
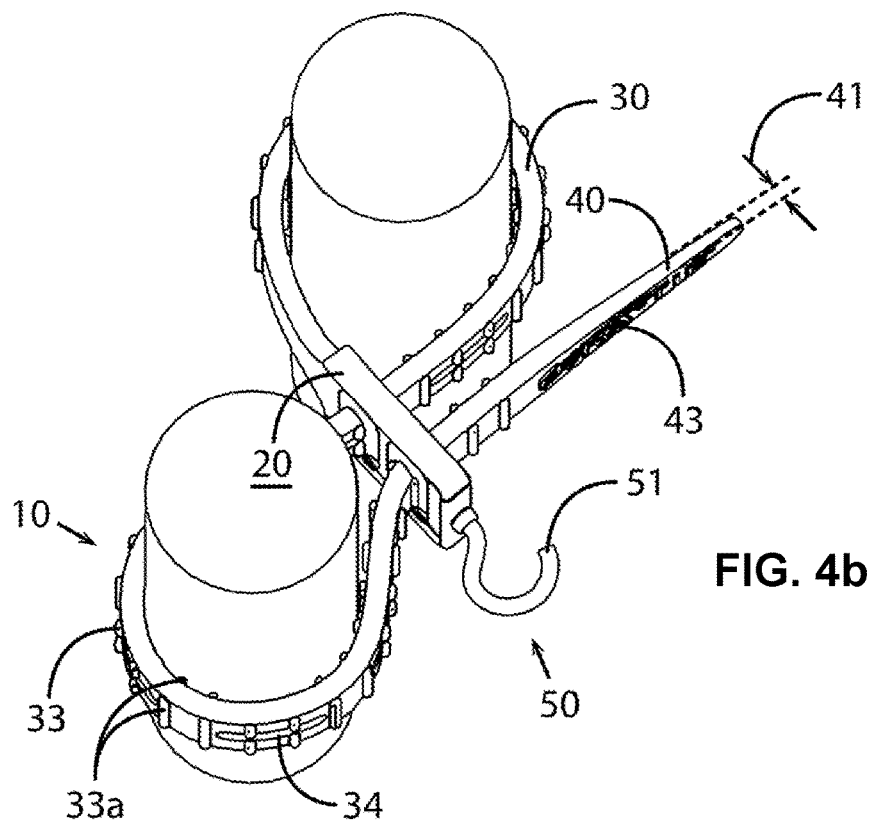
FIG. 4b shows the first embodiment secured to a first object by means of a first head aperture and further secured to a second object my means of a second head aperture.
Figure 4C:
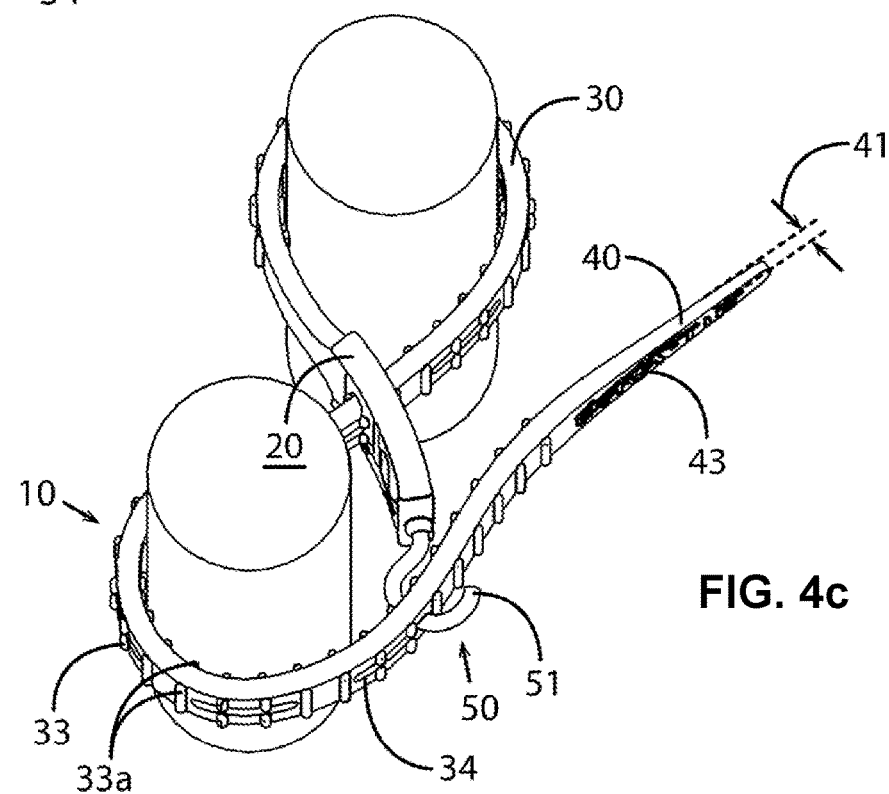
FIG. 4c shows the first embodiment secured to a first object by means of a first head aperture and further secured to a second object my means of the catch mechanism.

FIG. 4 shows an example application in which the tie strap 10 is semi-permanently secured to a first object by coupling the body 30 to a first head aperture 22. In FIG. 4a, the body 30 is wrapped around a second object but not yet secured thereto. In FIG. 4b, the tie strap 10 is secured to the second object by coupling the body 30 to a second head aperture 22. Although the body 30 can be readily decoupled from the second head aperture 22, inserting and withdrawing the body 30 through the second head aperture 22 can be slow. Also, the ridges 33 can eventually wear out from repeated insertions and withdrawals. FIG. 4c shows how the tie strap 10 can be secured to the second object by means of a catch mechanism 50 protruding axially from the distal end of the head 20. The catch lip 51 of the catch mechanism 50 may be inserted through a body aperture 34 to hold the tie strap 10 in place around the second object.

Figure 1B:
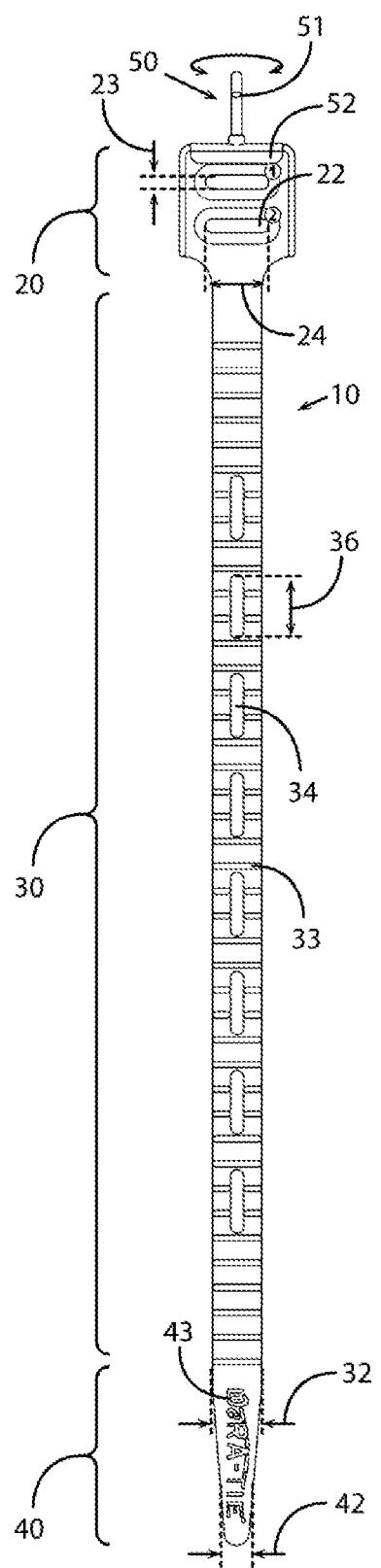
Figure 2:
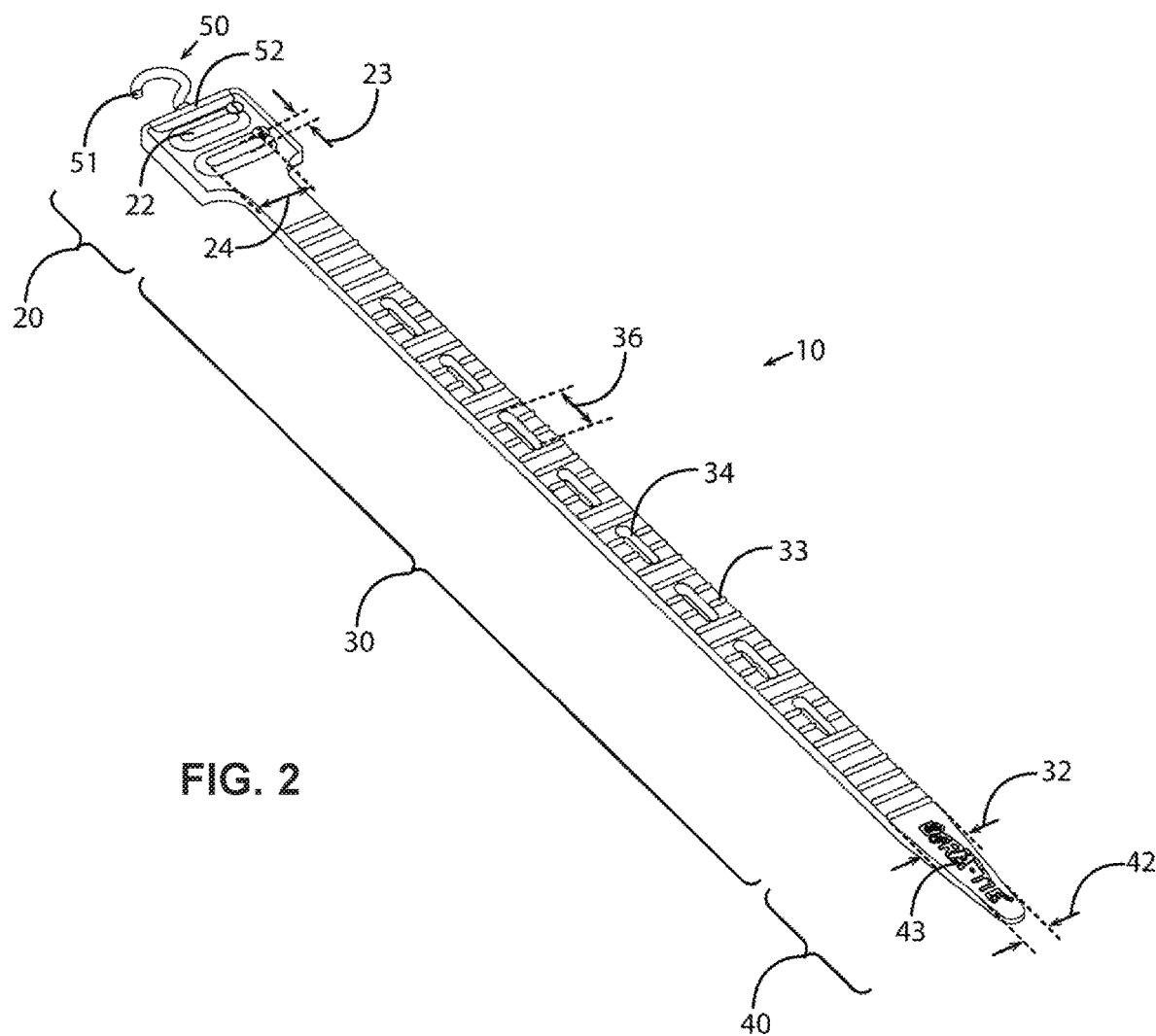
FIG. 2 is a perspective view of the first embodiment.

FIG. 5 shows the catch mechanism 50 in greater detail. The catch mechanism 50 may be made of metal, plastic, or any other material or materials having suitable strength. As shown in FIG. 1, the catch mechanism 50 may swivel or rotate to accommodate various strapping applications or to enable more compact stowage of the tie strap 10, for example when several tie straps 10 are stacked and bundled for retail packaging. FIG. 5b and FIG. 5c show an example swivel mechanism comprising a flanged housing adapted to receive a bulbous base of a hook member.

Figure 5A:
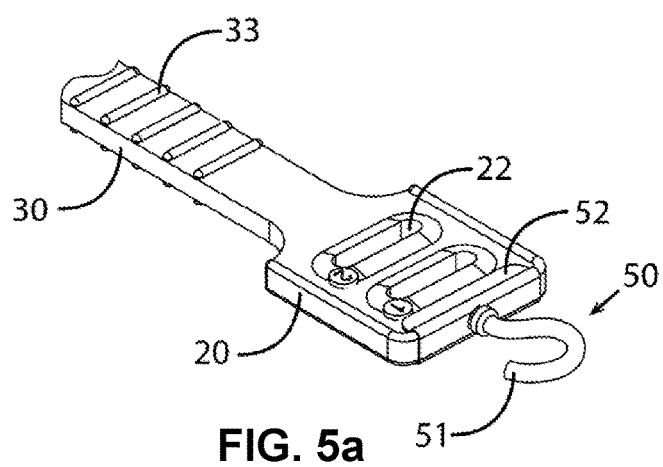
FIG. 5a is a first perspective view of the catch mechanism of the first embodiment.
Figure 5B:
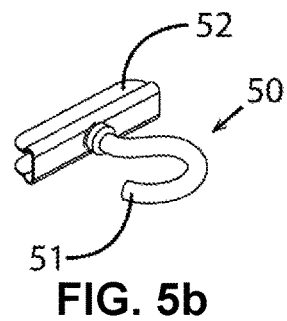
FIG. 5b shows the catch mechanism in isolation.
Figure 5C:
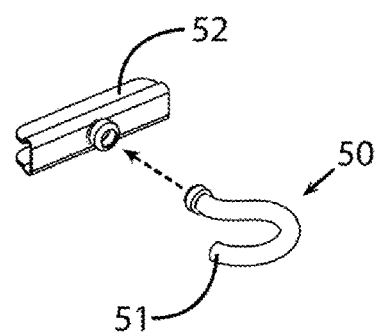
FIG. 5c shows the catch mechanism in isolation and exploded.
Figure 5D:
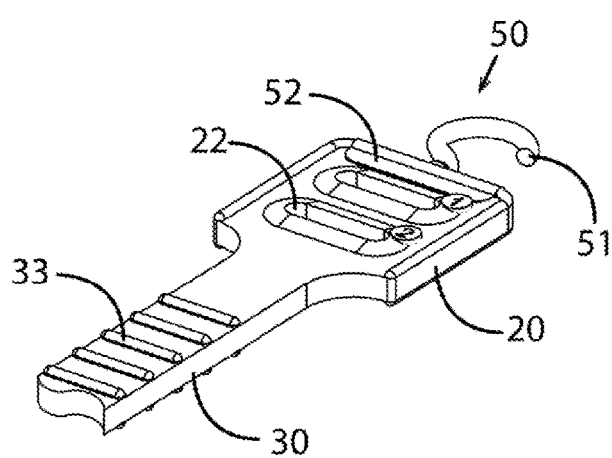
FIG. 5d is second perspective view of the catch mechanism of the first embodiment.
Figure 5E:
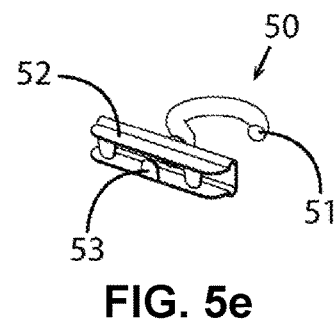
FIG. 5e shows the catch mechanism in isolation.
Figure 5F:
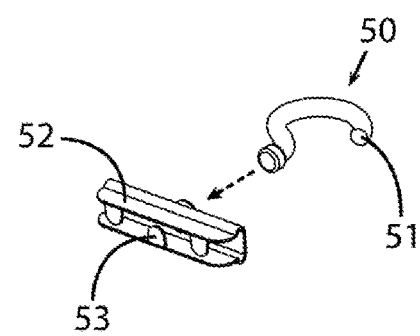
FIG. 5f shows the catch mechanism in isolation and exploded.

FIG. 5a and FIG. 5d show the catch mechanism 50 anchored to the tie strap 10 by means of a catch anchoring mechanism 52. In this first embodiment, the catch anchoring mechanism 52 comprises a pair of plates positioned on opposite lateral surfaces 11. Further, the catch anchoring mechanism 52 may comprise one or more inwardly oriented anchoring teeth 53 as shown in FIG. 5e and FIG. 5f. Each anchoring tooth 53 may either rest against a lateral surface 11 or pierce partially or completely therethrough. Consequently, the catch anchoring mechanism 52 may be molded in place with a tie strap 10 or it may be pressed or clamped onto a molded tie strap 10 like a pair of jaws.

Figure 6:
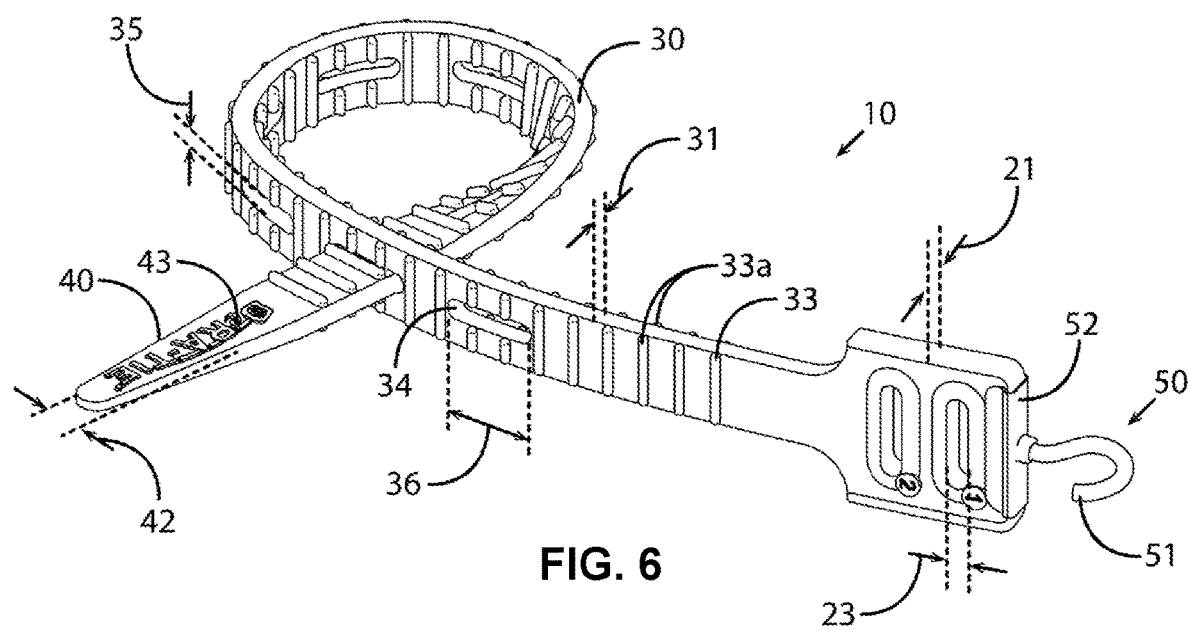
FIG. 6 is a perspective view of the first embodiment wherein the body apertures are adapted to engage with the body.

Although each body aperture 34 need only have shape and dimensions that are complementary with the catch mechanism 50 (for example circular body apertures 34 as shown in FIG. 13), making the shape and dimensions also complementary with the shape and dimensions of the body 30 permits the body apertures 34 to engage with the body 30 as shown in FIG. 6. If engagement of body apertures 34 with the body is desired, the body aperture height 35 (short dimension) should by substantially equal to the body thickness 31 and the body aperture width 36 (long dimension) should be substantially equal to the body width 32.

Figure 7:
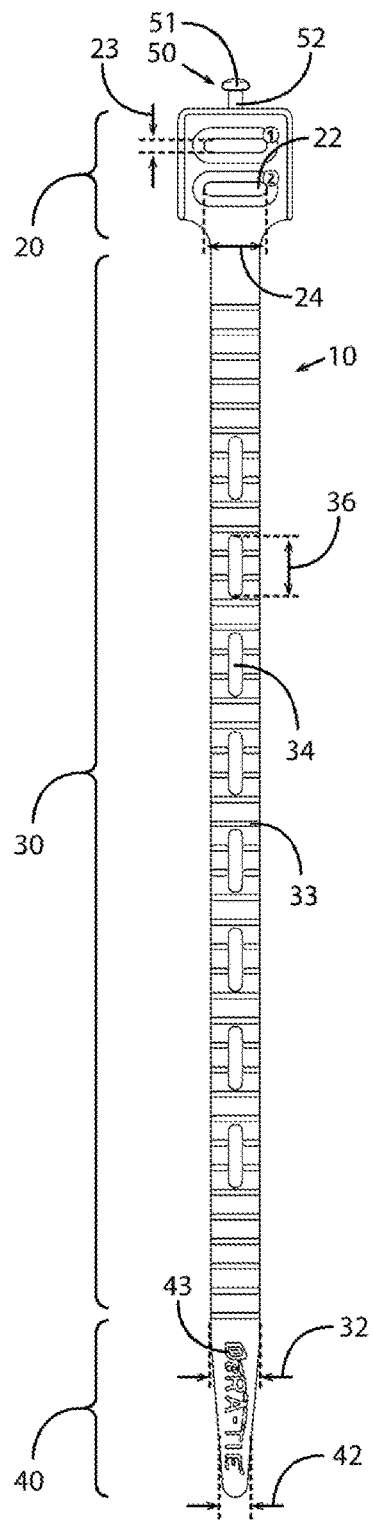
FIG. 7 is a top view of a second embodiment.
Figure 8A:
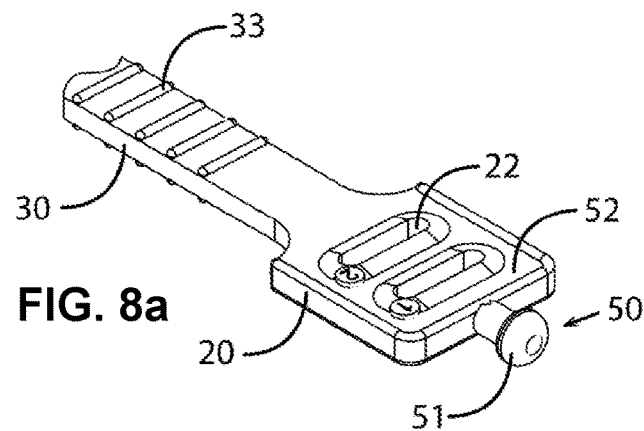
FIG. 8a is a first perspective view of the catch mechanism of the second embodiment.
Figure 8B:
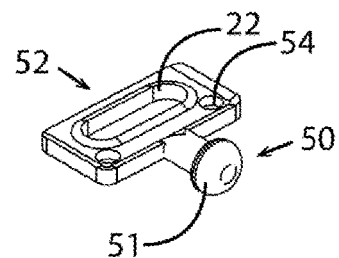
FIG. 8b shows the catch mechanism in isolation.
Figure 8C:
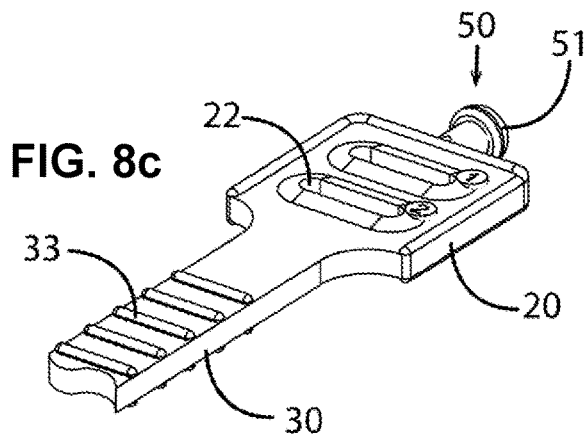
FIG. 8c is a second perspective view of the catch mechanism of the second embodiment.
Figure 8D:
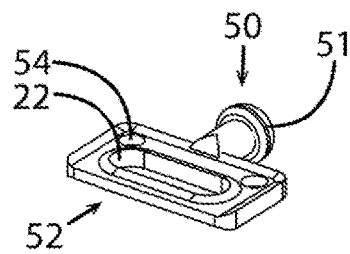
FIG. 8d shows the catch mechanism in isolation.

FIG. 7 shows a second embodiment of the tie strap 10 wherein the catch mechanism 50 comprises a cylindrical post protruding axially from the distal end of the head 20. The catch mechanism 50 has a bulbous catch lip 51 for coupling to a body aperture 34. FIG. 8 shows the catch mechanism 50 in greater detail. The catch mechanism 50 may be made of metal, plastic, or any other material or materials having suitable strength. In this second embodiment, the catch mechanism 50 is molded in place with the tie strap 10. Consequently, the anchoring mechanism 52 may comprise: (1) fusion of the tie strap 10 material with the catch mechanism 50 material; (2) friction between adjacent surfaces of the tie strap 10 and catch mechanism 50; and (3) anchoring of tie strap 10 material that may have lodged within holes, groves, or recesses in the catch mechanism 50 during molding, such as the anchoring holes 54 shown in FIG. 8b and FIG. 8d.

Figure 9A:
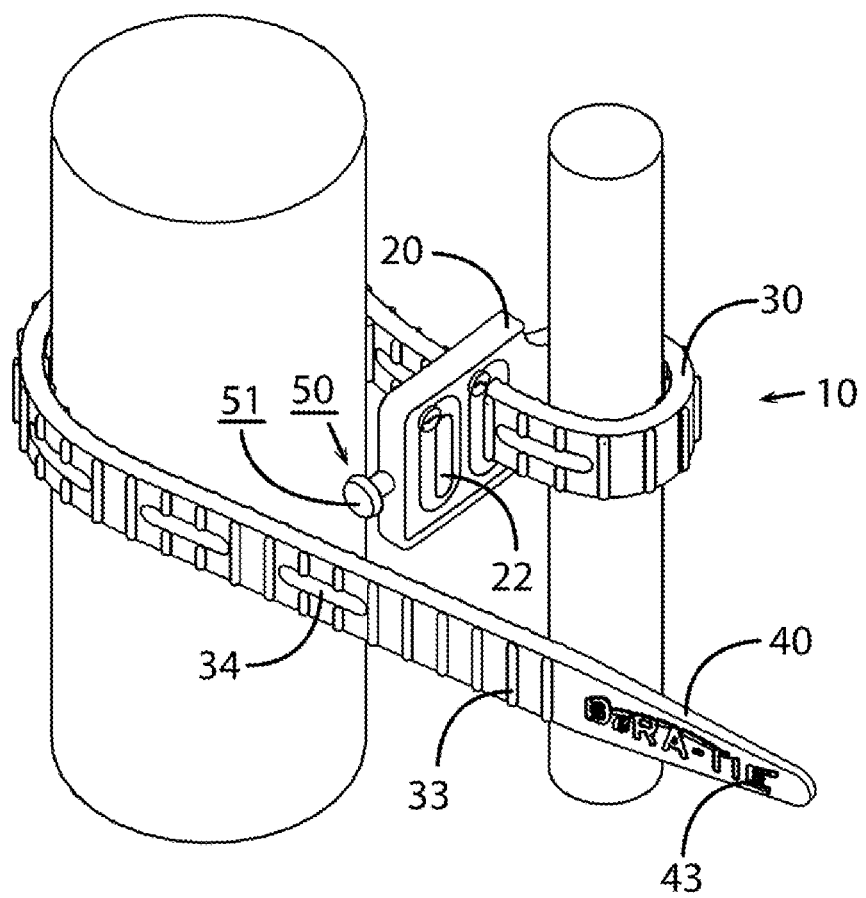
FIG. 9a shows the second embodiment secured to a first object by means of a first head aperture.
Figure 9B:
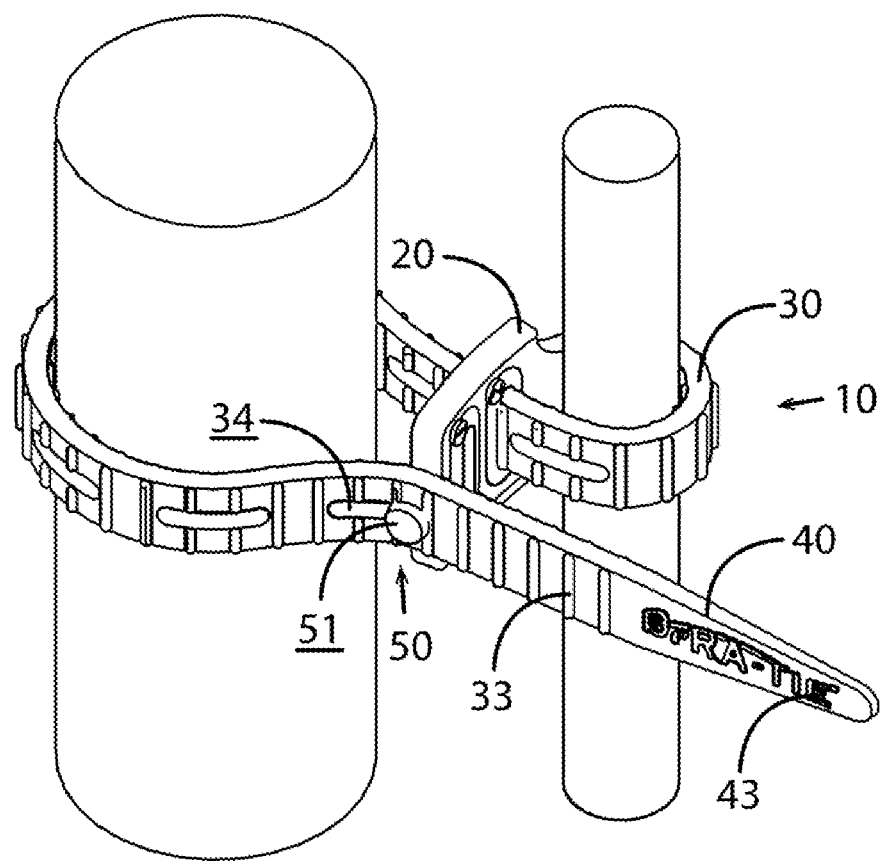
FIG. 9b shows the second embodiment secured to a first object by means of a first head aperture and further secured to a second object my means of the catch mechanism.

FIG. 9 shows an example application of the second embodiment in which the tie strap 10 is semi-permanently secured to a first object by coupling the body 30 to a first head aperture 22. In FIG. 9a, the body 30 is wrapped around a second object but not yet secured thereto. In FIG. 9b, the tie strap 10 is secured to the second object by coupling the catch mechanism 50 to a body aperture 34. The catch lip 51 is adapted to readily pass through the body aperture 34 in the direction of insertion and to resist passing through the body aperture 34 in the direction of withdrawal.

Figure 10:
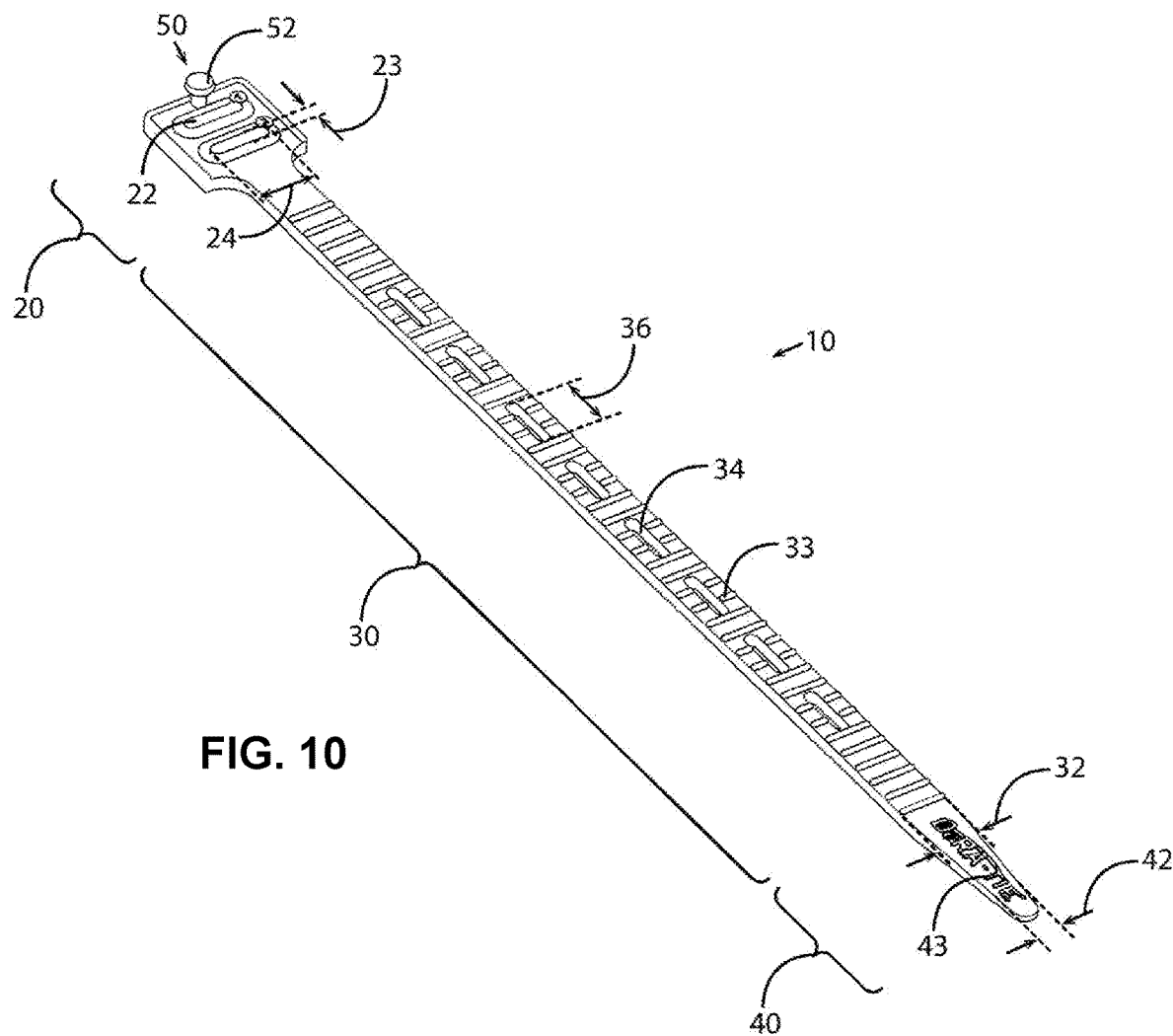
FIG. 10 is a perspective view of a third.
Figure 11A:
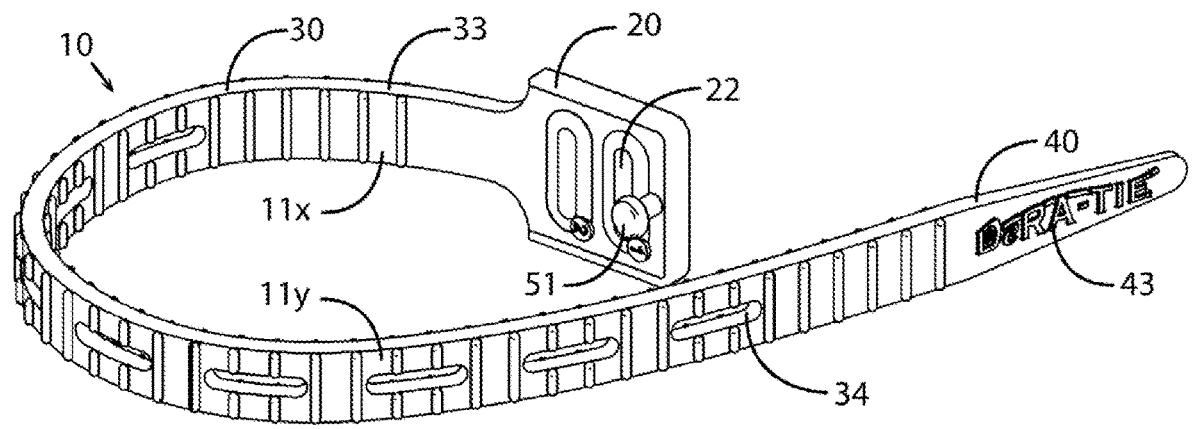
FIG. 11a shows the third embodiment prior to engaging the catch mechanism to a body aperture.
Figure 11B:
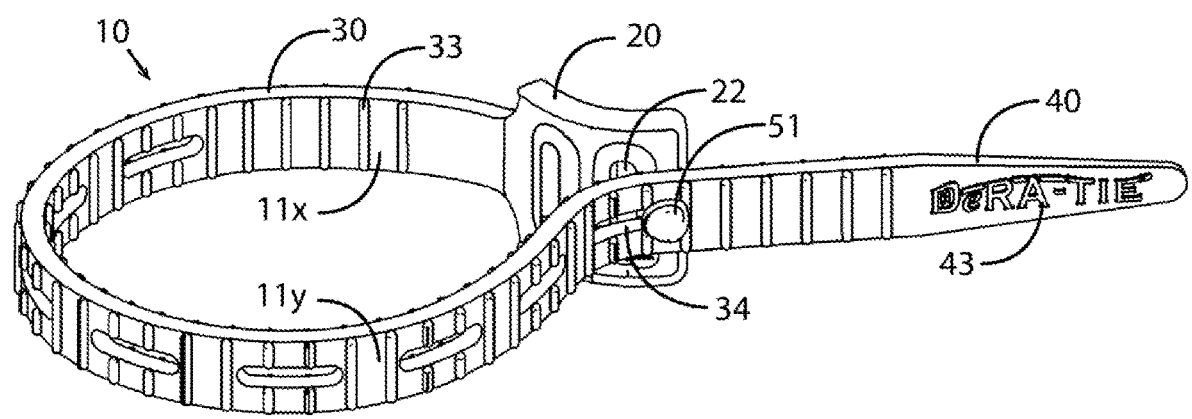
FIG. 11b shows the catch mechanism engaged to a body aperture.

FIG. 10 shows a third embodiment of the tie strap 10 wherein the catch mechanism 50 comprises a cylindrical post protruding transversely from the distal end of the head 20. The catch mechanism 50 has a bulbous catch lip 51 for coupling to a body aperture 34. FIG. 11a shows the tie strap 10 prior to coupling of the catch mechanism 50 to a body aperture 34; FIG. 11b shows the tie strap 10 with the catch mechanism 50 coupled to a body aperture 34.

FIG. 12 shows a fourth embodiment of the tie strap 10 wherein the catch mechanism 50 comprises a grapple hook protruding axially from the distal end of the head 20. As in the first embodiment, the catch mechanism 50 may swivel. Further, the catch mechanism 50 may be bifurcated, trifurcated, and so on.

Finally, FIG. 13 shows a fifth embodiment of the tie strap 10 wherein the body apertures 34 have shape and dimensions complementary with the catch mechanism 50 but not complementary with the body 30. A tie strap 10 configuration as shown in FIG. 6 is not possible with this fifth embodiment.

Although tie straps 10 may be manufactured in various lengths, widths, and thicknesses to suit particular applications, it should be appreciated that tie straps 10 having compatible dimensions may permit chaining to increase the effective strapping length.

Many modifications, configurations, and features may be evident that do not depart from the spirit and scope of the several embodiments of this disclosure. Although specific embodiments have been illustrated and described, it should be understood that the embodiments are exemplary, non-exhaustive, and should not limit the scope of the several embodiments of this disclosure as defined by the appended claims.

What is claimed is:

1. A substantially flat tie strap comprising:
   a first region defining a first thickness, having a plurality of first apertures each with a first aperture height and a first aperture width, and further having a hooked or knobbed catch mechanism protruding from a distal portion;
   an elongated second region defining a second thickness substantially equal to said first aperture height and a second width substantially equal to said first aperture width, having a plurality of ridge pairs each comprising transversely oriented ridges disposed on opposite lateral surfaces wherein the distance between adjacent said ridge pairs is substantially equal to said first thickness, and further having a plurality of second apertures each adapted to receive said catch mechanism; and a third elongated region defining a third thickness less than said first aperture height.

2. The tie strap of claim 1 wherein each of said second apertures has a second aperture height substantially equal to said first aperture height and a second aperture width substantially equal to said first aperture width.

3. The tie strap of claim 1 further comprising at least one embossed element disposed on at least one lateral surface of said third region.

4. The tie strap of claim 1 comprised substantially of elastomeric material.

5. The tie strap of claim 2 further comprising at least one embossed element disposed on at least one lateral surface of said third region.

6. The tie strap of claim 2 comprised substantially of elastomeric material.

7. The tie strap of claim 3 comprised substantially of elastomeric material.

8. The tie strap of claim 5 comprised substantially of elastomeric material.

\* \* \* \* \*